(12) United States Patent
Maeng

(10) Patent No.: US 11,580,385 B2
(45) Date of Patent: Feb. 14, 2023

(54) ARTIFICIAL INTELLIGENCE APPARATUS FOR CLEANING IN CONSIDERATION OF USER'S ACTION AND METHOD FOR THE SAME

(71) Applicant: LG ELECTRONICS INC., Seoul (KR)

(72) Inventor: Jichan Maeng, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 760 days.

(21) Appl. No.: 16/538,595

(22) Filed: Aug. 12, 2019

(65) Prior Publication Data

US 2019/0362234 A1 Nov. 28, 2019

(30) Foreign Application Priority Data

Jul. 2, 2019 (KR) .................. 10-2019-0079715

(51) Int. Cl.
| | | |
|---|---|---|
| *G06N 3/08* | (2006.01) | |
| *G06N 5/02* | (2006.01) | |
| *B25J 9/16* | (2006.01) | |
| *A47L 9/28* | (2006.01) | |
| *A47L 11/40* | (2006.01) | |
| *G06V 40/20* | (2022.01) | |

(52) U.S. Cl.
CPC .............. *G06N 3/08* (2013.01); *A47L 9/2842* (2013.01); *A47L 9/2847* (2013.01); *A47L 9/2852* (2013.01); *A47L 11/4011* (2013.01); *B25J 9/163* (2013.01); *B25J 9/1697* (2013.01); *G06N 5/02* (2013.01); *G06V 40/20* (2022.01); *A47L 2201/04* (2013.01); *A47L 2201/06* (2013.01)

(58) Field of Classification Search
CPC .......... G06N 3/08; G06N 5/02; G06N 3/0445; G06N 3/0454; A47L 9/2842; A47L 9/2847; A47L 9/2852; A47L 11/4011; A47L 2201/04; A47L 2201/06; A47L 9/2805; A47L 11/4063; A47L 11/4094; B25J 9/163; B25J 9/1697; B25J 11/0085; B25J 9/0003; B25J 9/161; B25J 9/1664; B25J 13/08; B25J 19/023; G06V 40/20; G06V 10/82; G06V 20/10; G05D 2201/0203; G05D 1/0221; G05D 1/0246; H04L 12/282

See application file for complete search history.

(56) References Cited

U.S. PATENT DOCUMENTS

| | | | |
|---|---|---|---|
| 10,042,038 B1* | 8/2018 | Lord | G10L 25/30 |
| 10,575,699 B2* | 3/2020 | Bassa | G05D 1/0274 |
| 11,160,432 B2* | 11/2021 | Bassa | G06V 20/10 |
| 2005/0120505 A1* | 6/2005 | Tani | G08B 13/19695 15/319 |
| 2005/0237188 A1* | 10/2005 | Tani | G05D 1/0274 340/541 |

(Continued)

*Primary Examiner* — Bhavesh V Amin
(74) *Attorney, Agent, or Firm* — Lee, Hong, Degerman, Kang & Waimey PC

(57) ABSTRACT

An AI robot for cleaning in consideration of a user's action includes a camera to acquire a first image data for the user, a cleaning unit including a suction unit and a mopping unit, a driving unit configured to drive the AI robot, and a processor to determine the user's action using the first image data, determine a cleaning schedule in consideration of the user's action, and control the cleaning unit and the driving unit based on the determined cleaning schedule.

20 Claims, 15 Drawing Sheets

(56) References Cited

U.S. PATENT DOCUMENTS

| | | | | |
|---|---|---|---|---|
| 2006/0069463 A1* | 3/2006 | Kim | .................. | A47L 7/0085 318/568.12 |
| 2014/0207282 A1* | 7/2014 | Angle | .................. | H04W 4/30 901/1 |
| 2014/0218517 A1* | 8/2014 | Kim | .............. | H04N 21/41407 348/143 |
| 2015/0032260 A1* | 1/2015 | Yoon | .................. | A47L 9/2857 700/257 |
| 2015/0052703 A1* | 2/2015 | Lee | .................. | G05D 1/0255 701/28 |
| 2015/0367513 A1* | 12/2015 | Gettings | ............ | B25J 9/0084 700/248 |
| 2016/0075015 A1* | 3/2016 | Izhikevich | .......... | B25J 9/163 901/5 |
| 2016/0075016 A1* | 3/2016 | Laurent | .............. | G05B 15/02 700/47 |
| 2016/0075017 A1* | 3/2016 | Laurent | ................ | B25J 9/163 901/5 |
| 2016/0075034 A1* | 3/2016 | Laurent | .............. | G05B 15/02 700/264 |
| 2016/0096643 A1* | 4/2016 | Baylor | ................ | B65B 35/18 53/443 |
| 2016/0167226 A1* | 6/2016 | Schnittman | ........ | G06V 30/194 901/1 |
| 2016/0195856 A1* | 7/2016 | Spero | ................ | H05B 47/155 700/90 |
| 2017/0215261 A1* | 7/2017 | Potucek | ............. | E04H 4/1272 |
| 2017/0364091 A1* | 12/2017 | Bennett | .................. | A47L 7/00 |
| 2018/0074508 A1* | 3/2018 | Kleiner | .............. | G05D 1/0219 |
| 2018/0210445 A1* | 7/2018 | Choi | .................. | G05D 1/0238 |
| 2018/0315162 A1* | 11/2018 | Sturm | .................. | G06T 15/10 |
| 2018/0353042 A1* | 12/2018 | Gil | .................. | A47L 9/2826 |
| 2018/0369847 A1* | 12/2018 | Kihm | ................ | G05D 7/0629 |
| 2019/0114798 A1* | 4/2019 | Afrouzi | .................. | G06T 7/30 |
| 2019/0208979 A1* | 7/2019 | Bassa | ................ | G05D 1/0234 |

\* cited by examiner

FIG. 11

| OPERATION MODE | USER'S ACTION | CLEANING SCHEDULE |
|---|---|---|
| FIRST MODE | SWEEPING | VACUUMING |
| | MOPPING | MOPPING |
| | VACUUMING | VACUUMING |
| SECOND MODE | SWEEPING | VACUUMING OR MOPPING |
| | MOPPING | VACUUMING |
| | VACUUMING | MOPPING |
| | LIFTING OBJECT | VACUUMING OR MOPPING |
| | MOVING OBJECT | VACUUMING OR MOPPING |

FIG. 12
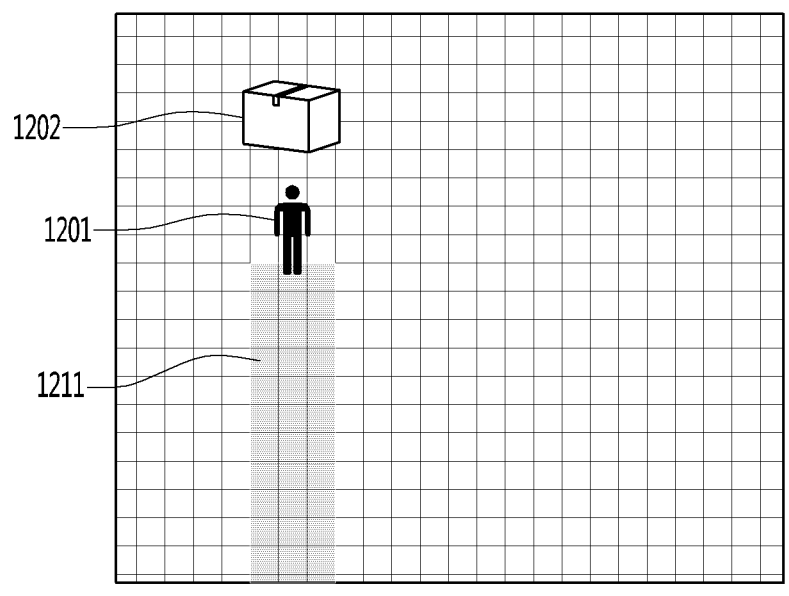
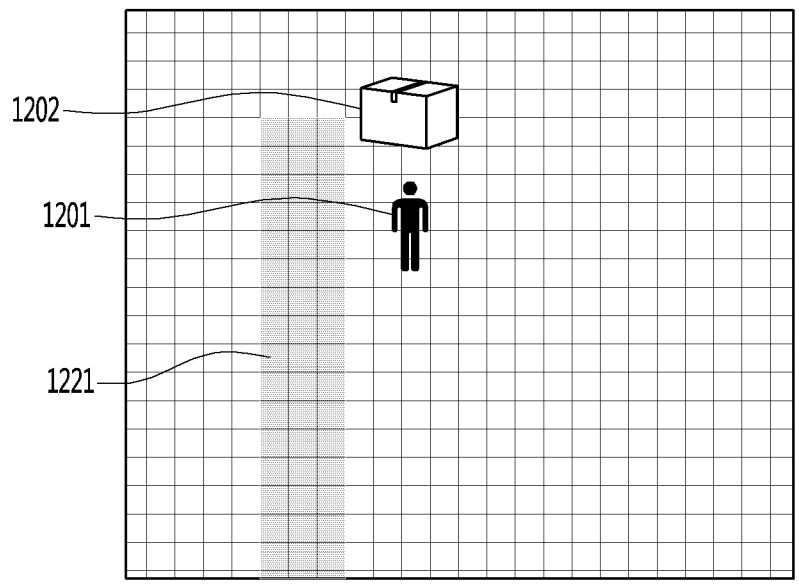

FIG. 15
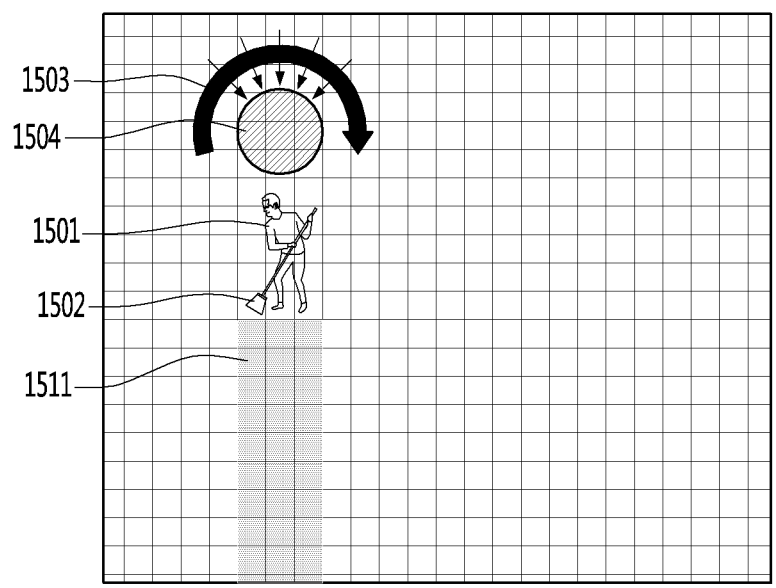
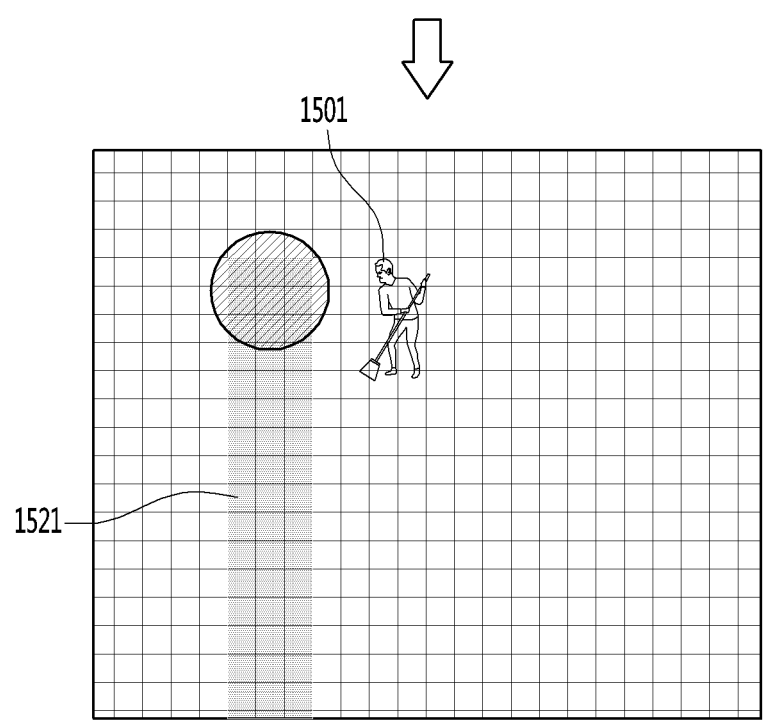

ARTIFICIAL INTELLIGENCE APPARATUS FOR CLEANING IN CONSIDERATION OF USER'S ACTION AND METHOD FOR THE SAME

CROSS-REFERENCE TO RELATED APPLICATIONS

Pursuant to 35 U.S.C. § 119(a), this application claims the benefit of earlier filing date and right of priority to Korean Patent Application No. 10-2019-0079715, filed on Jul. 2, 2019, the contents of which are hereby incorporated by reference herein in its entirety.

BACKGROUND

The present invention relates to an AI apparatus in consideration of a user's action and a method for the same. In detail, the present invention relates to an AI apparatus to recognize the user's action, and to perform cleaning appropriately to the user's action, and a method for the same.

A robot cleaner is an AI apparatus to self-drive in an area to be cleaned without the manipulation of a user to suction foreign matters, such as dust, from the floor, thereby automatically cleaning.

Such a robot cleaner sets a cleaning path by recognizing the structure of a space and cleans while travelling along the set cleaning path. In addition, the robot cleaner cleans based on a predetermined schedule or a user command.

However, an existing robot cleaner may only clean while simply moving along a predetermined route, without providing a systematically cleaning operation in consideration of the user's action.

When the robot cleaner cleans in consideration of the user's action, the cleaning efficiency may be enhanced and the user's satisfaction may be extended.

SUMMARY

The present invention is to provide an AI apparatus to perform a cleaning operation of assisting a user's action and a method for the same.

The present invention is to provide an AI apparatus to perform a cleaning operation of supplementing the cleaning action of the user based on the operation mode when the user performs cleaning or to perform the same cleaning of the cleaning of the user, and a method for the same.

The present invention is to provide an AI apparatus to perform cleaning when it is determined that the cleaning is necessary, based on the user's action, and a method for the same.

An embodiment of the present invention provides an AI apparatus, which acquires a first image data for the user to recognize the user's action, determines a cleaning schedule to perform cleaning of assisting the user's action in consideration of the user's action, and performs cleaning based on the determined cleaning schedule, and a method for the same.

In addition, an embodiment of the present invention provides an AI apparatus, which determines a cleaning schedule to perform a cleaning operation suitable for the user's action, based on the operation mode, and a method for the same.

Further, an embodiment of the present invention provides an AI apparatus, which determines a cleaning schedule to perform the same cleaning operation as the cleaning operation of the user, if the operation mode is the first mode and the user is cleaning, In addition, an embodiment of the present invention provides an AI apparatus, which determines a cleaning schedule to perform the cleaning operation of supplementing the cleaning operation of the user if the operation mode is the second mode and the user is cleaning, and a method for the same.

Further, an embodiment of the present invention provides an AI apparatus, which obtains image data for a user from external devices or obtains information on the user's action from the external devices to determine the cleaning schedule based on the user's action, and a method for the same.

As described above, according to various embodiments of the present invention, the AI apparatus having a cleaning function may more rapidly and effectively clean by assisting the cleaning action of the user.

In addition, according to various embodiments of the present invention, the AI apparatus having the cleaning function determines that the cleaning is necessary based on the user's action and cleans based on the determination, thereby increasing the convenience of the user.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 11 is a diagram illustrating an example of a cleaning schedule based on an operation mode and the user's action according to an embodiment of the present invention.

FIG. 12 is a diagram illustrating an example of a cleaning schedule according to an embodiment of the present invention.

FIG. 15 is a diagram illustrating an example of a cleaning schedule according to an embodiment of the present invention.

DETAILED DESCRIPTION OF THE EMBODIMENTS

Figure 1:
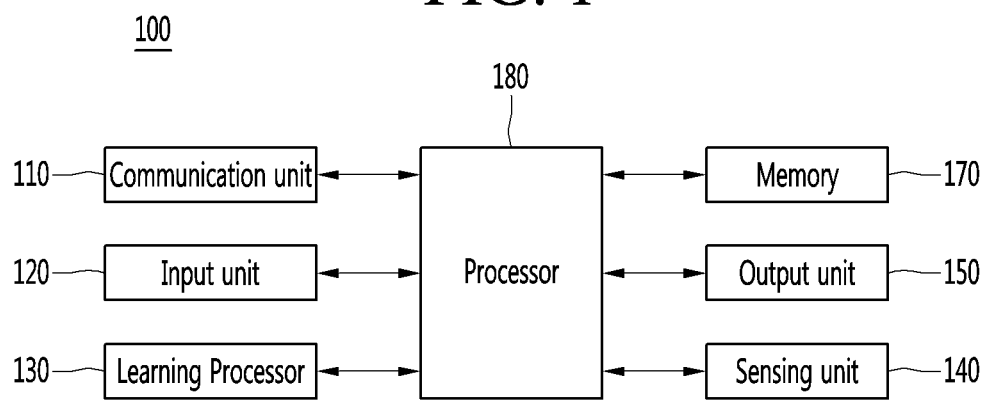
FIG. 1 is a block diagram illustrating an AI apparatus according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present invention.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other AI apparatuses 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
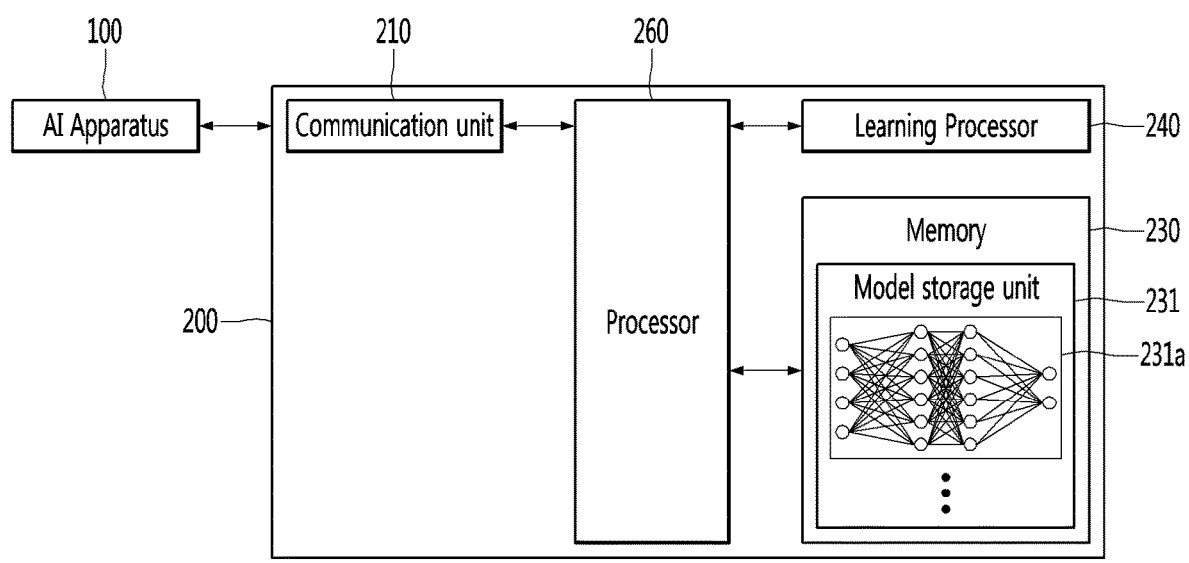
FIG. 2 is a block diagram illustrating an AI server according to an embodiment of the present invention.

FIG. 2 is a block diagram illustrating an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
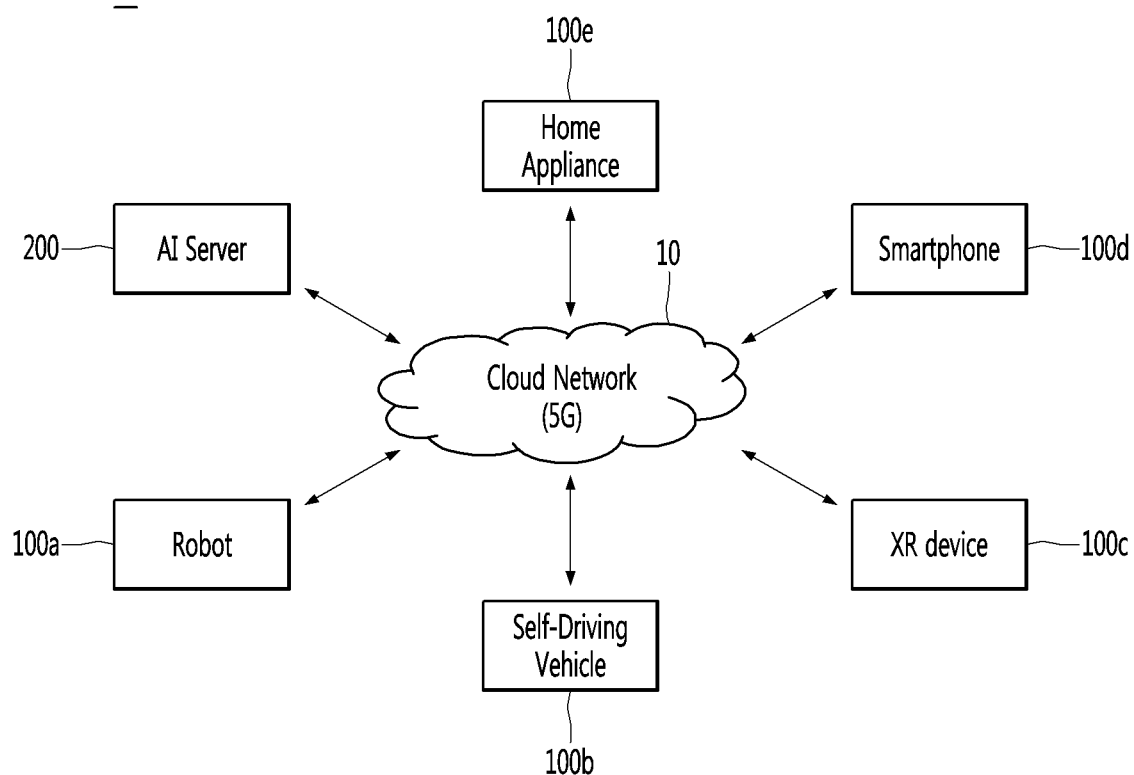
FIG. 3 is a diagram illustrating an AI system according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

At this time, the AI server 200 may learn the artificial neural network according to the machine learning algorithm instead of the AI apparatuses 100a to 100e, and may directly store the learning model or transmit the learning model to the AI apparatuses 100a to 100e.

At this time, the AI server 200 may receive input data from the AI dev AI apparatuses ices 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
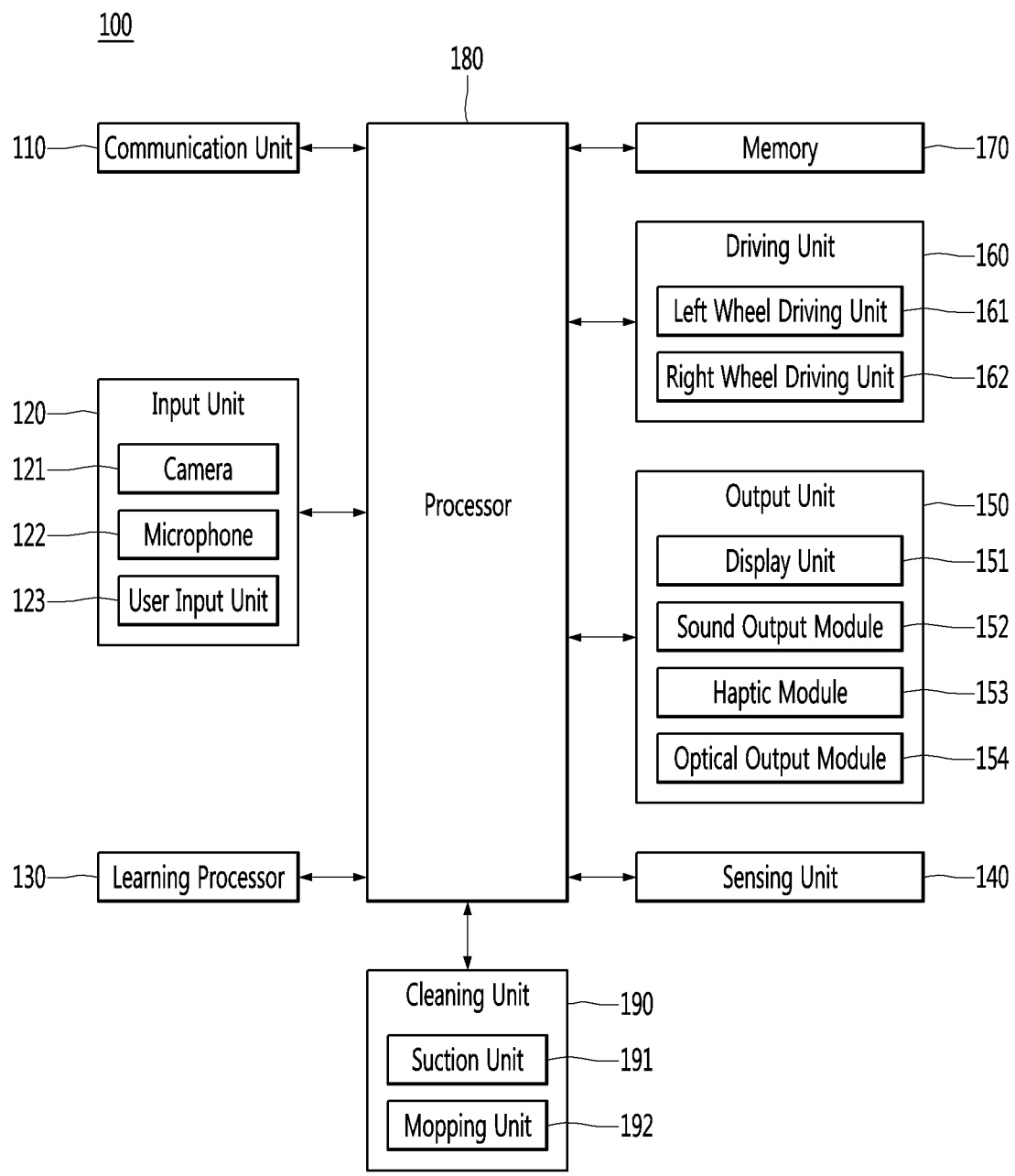
FIG. 4 is a block diagram illustrating an AI apparatus according to an embodiment of the present invention.

FIG. 4 illustrates an AI apparatus 100 according to an embodiment of the present invention.

The redundant repeat of FIG. 1 will be omitted below.

Hereinafter, an AI apparatus or an AI device may be called an AI robot or an artificial intelligence robot.

Referring to FIG. 4, the AI robot 100 may further include a driving unit 160 and a cleaning unit 190.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI robot 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI robot 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI robot 100 to correspond to the inputted information.

The user input unit 123 may include a mechanical input means (or a mechanical key, for example, a button, a dome switch, a jog wheel, and a jog switch at the front, back or side of the AI robot 100) and a touch type input means. As one example, a touch type input means may include a virtual key, a soft key, or a visual key, which is displayed on a touch screen through software processing or may include a touch key disposed at a portion other than the touch screen.

The sensing unit 140 may be called a sensor unit.

The sensing unit 140 may include at least one of a depth sensor (not illustrated) or an RGB sensor (not illustrated) to acquire image data for a surrounding of the AI robot 100.

The depth sensor may sense that light irradiated from the light emitting unit (not illustrated) is reflected and return. The depth sensor may measure the difference between times at which the returning light is transmitted, an amount of the returning light, and a distance from an object.

The depth sensor may acquire information on a two dimensional image or a three dimensional image of the surrounding of the AI robot 100, based on the distance from the object.

The RGB sensor may obtain information on a color image for an object or a user around the AI robot 100. The information on the color image may be an image obtained by photographing an object. The RGB sensor may be named an RGB camera.

In this case, the camera 121 may refer to the RGB sensor.

The output unit 150 may include at least one of a display unit 151, a sound output module 152, a haptic module 153, or an optical output module 154.

The display unit 151 may display (output) information processed in the AI robot 100. For example, the display unit 151 may display execution screen information of an application program running on the AI robot 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI robot 100 and a user, and an output interface between the AI robot 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI robot 100. An example of an event occurring in the AI robot 100 includes message reception, call signal reception, missed calls, alarm, schedule notification, e-mail reception, and information reception through an application.

The driving unit 160 may move the AI robot 100 in a specific direction or by a certain distance.

The driving unit 160 may include a left wheel driving unit 161 to drive the left wheel of the AI robot 100 and a right wheel driving unit 162 to drive the right wheel.

The left wheel driving unit 161 may include a motor for driving the left wheel, and the right wheel driving unit 162 may include a motor for driving the right wheel.

Although the driving unit 160 includes the left wheel driving unit 161 and the right wheel driving unit 162 by way of example as in FIG. 4, but the present invention is not limited thereto. In other words, according to an embodiment, the driving unit 160 may include only one wheel.

The cleaning unit 190 may include at least one of a suction unit 191 or a mopping unit 192 to clean the floor around the AI robot 100.

The suction unit 191 may be referred to as a vacuum cleaning unit.

The suction unit 191 may suction air to suction foreign matters such as dust and garbage around the AI robot 100.

In this case, the suction unit 191 may include a brush or the like to collect foreign matters.

The mopping unit 192 may wipe the floor in the state that a mop is at least partially in contact with the bottom surface of the AI robot 100.

In this case, the mopping unit 192 may include a mop and a mop driving unit to move the mop In this case, the mopping unit 192 may adjust the distance from the ground surface through the mop driving unit. In other words, the mop driving unit may operate such that the mop makes contact with the ground surface when the mopping is necessary.

Figure 5:
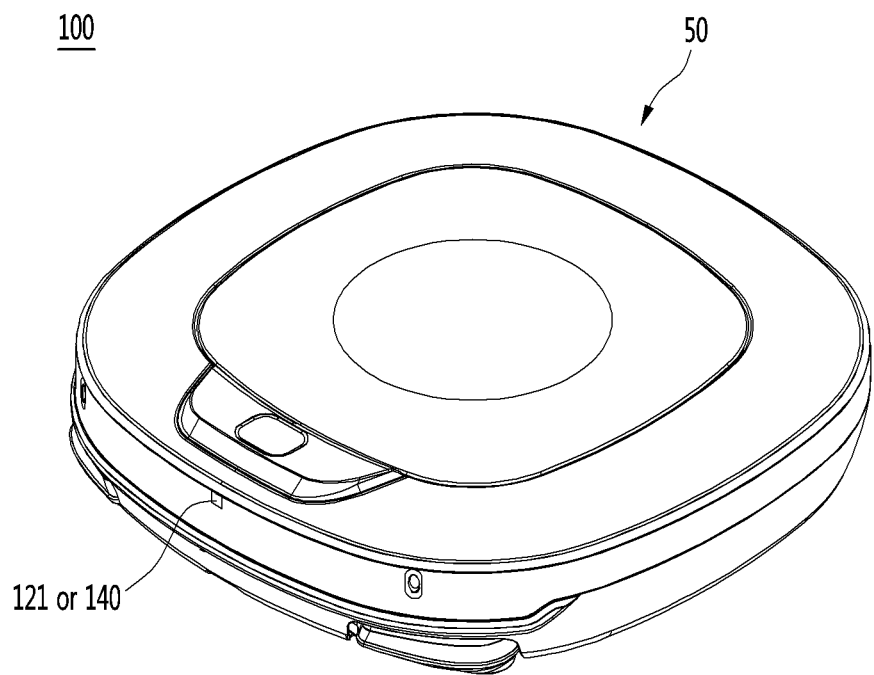
FIG. 5 a perspective view of an AI robot according to an embodiment of the present invention.

FIG. 5 a perspective view of the AI robot 100 according to an embodiment of the present invention.

Referring to FIG. 5, the AI robot 100 may include a cleaner body 50 and a camera 121 or a sensing unit 140.

The camera 121 or the sensing unit 140 may irradiate a light forward and receive the reflected light.

The camera 121 or the sensing unit 140 may acquire the depth information using the difference between times at which the received lights are returned.

The cleaner body 50 may include remaining components except the camera 121 and the sensing unit 140 described with reference to FIG. 4.

Figure 6:
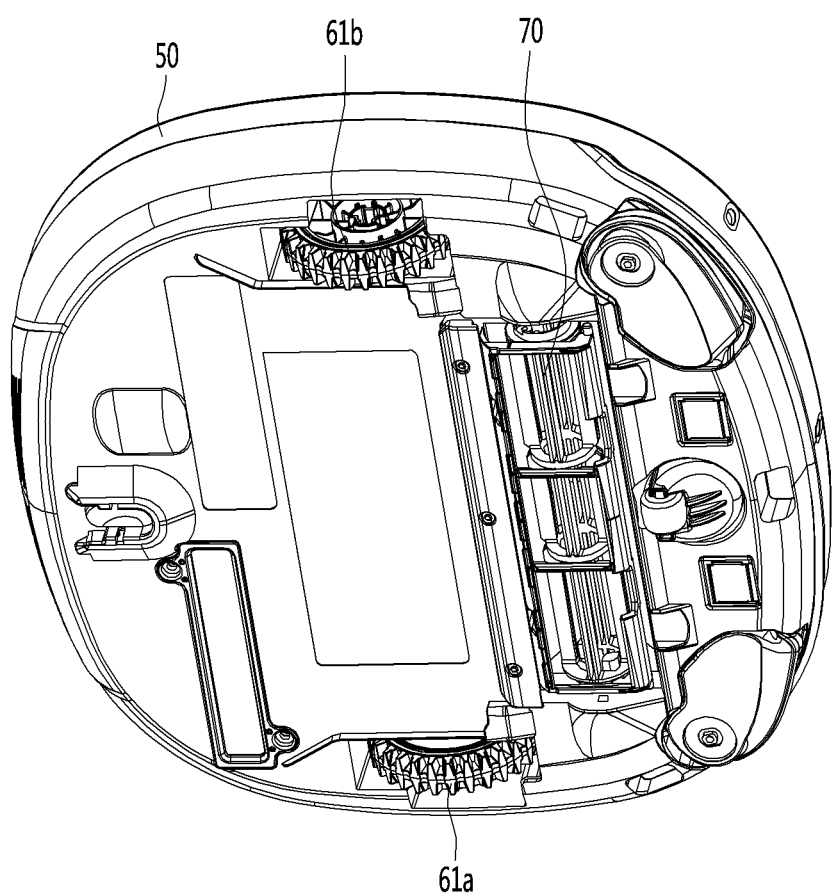
FIG. 6 a bottom view of an AI robot according to an embodiment of the present invention.

FIG. 6 is a bottom view of the AI robot 100 according to an embodiment of the present invention.

Referring to 6, the AI robot 100 may further include a cleaner body 50, a left wheel 61a, a right wheel 61b, and a suction unit 70 in addition to the components of FIG. 4.

The left wheel 61a and the right wheel 61b may allow the cleaner body 50 to travel.

The left wheel driving unit 161 may drive the left wheel 61a and the right wheel driving unit 162 may drive the right wheel 61b.

As the left wheel 61a and the right wheel 61b are rotated by the driving unit 160, the AI robot 100 may suction foreign matters such as dust and garbage through the suction unit 70.

The suction unit 70 is provided in the cleaner main body 50 to suction dust on the floor surface.

The suction unit 70 may further include a filter (not illustrate) to collect foreign matters from the sucked air stream and a foreign matter receiver (not illustrated) to accumulate foreign matters collected through the filter.

In addition to the components of FIG. 4, the AI robot 100 may further include a mopping unit (not illustrated).

The mopping unit (not shown) may include a damp cloth/mop (not illustrated) and a motor (not illustrated) to rotate the damp cloth in contact with the floor and to move the damp cloth along a set pattern.

The AI robot 100 may wipe the floor with the damp cloth (not illustrated).

Figure 7:
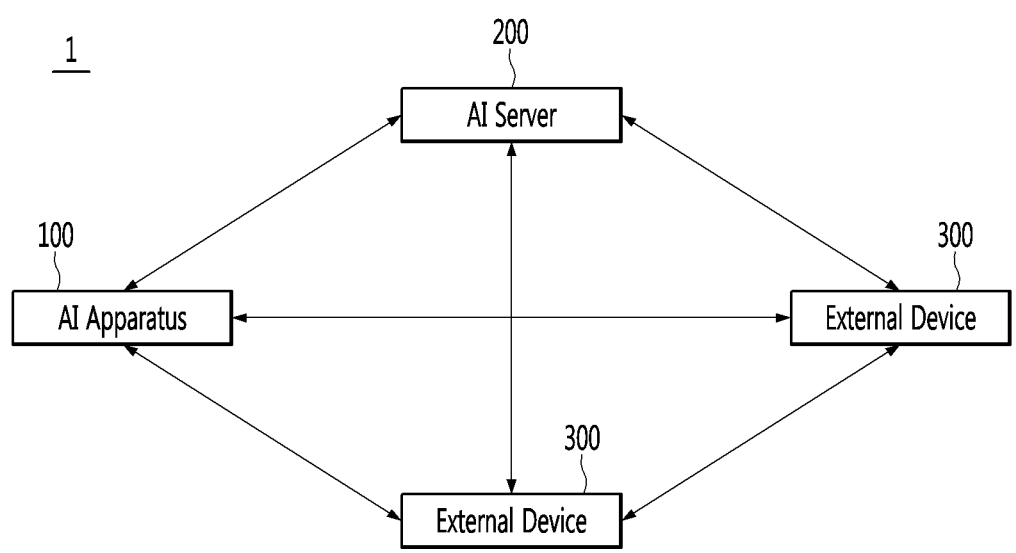
FIG. 7 is a diagram illustrating an AI system according to an embodiment of the present invention.

FIG. 7 is a diagram illustrating an AI system 1 according to an embodiment of the present invention.

Referring to FIG. 7, the AI system 1 may include an AI robot 100, an AI server 200, and one or more external device 300. In this case, the external devices 300 are not essential components.

The AI robot 100, the AI server 200, and the external device 300 may communicate with each other through wired/wireless communication technologies.

In particular, some of the AI robot 100, the AI server 200, or the external device 300 may communicate with each other through a fifth generation (5G) network technology.

The external device 300 or the external device may refer not to the AI robot 100 according to the embodiment of the present invention, but may refer to a device including a camera or an image sensor.

The external device 300 may include an AI robot or an IoT (Internet of Things) device.

For example, the external device 300 may include various home appliances having a camera installed on the premises.

The external device 300 may acquire image data for a user through the camera and may transmit the acquired image data to the AI robot 100.

Alternatively, the external device 300 may obtain information on a user's action from image data directly or the AI server 200 and may transmit the obtained information on the user's action information to the AI robot 100.

Figure 8:
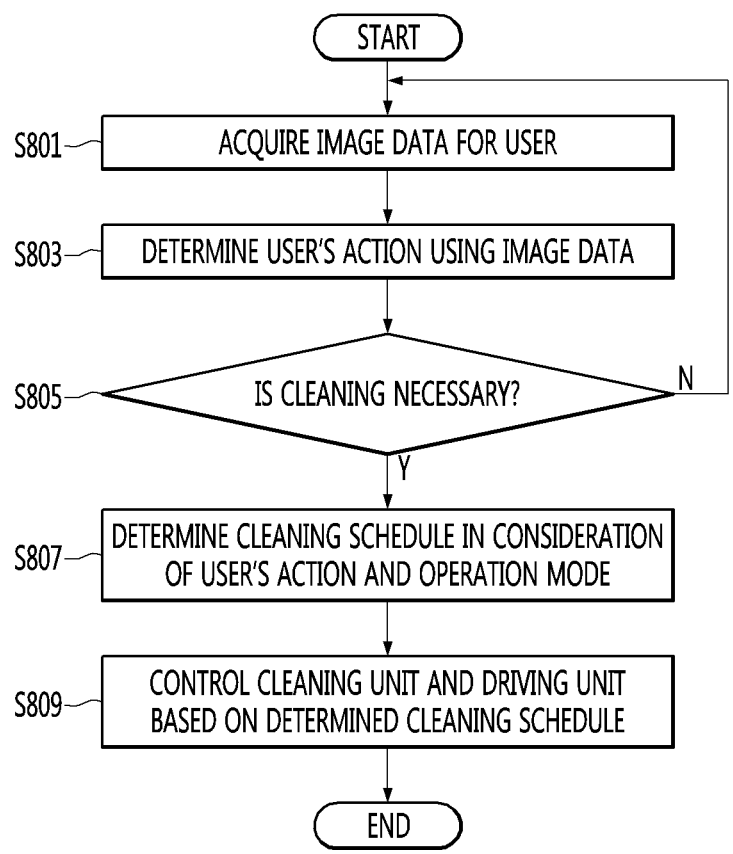
FIG. 8 is a flowchart illustrating a method for assisting cleaning according to an embodiment of the present invention.

FIG. 8 is a flowchart illustrating a method for assisting cleaning, according to an embodiment of the present invention.

Referring to FIG. 8, the processor 180 of the AI robot 100 acquires image data for a user (S801).

The image data for the user may refer to image data including a user.

The image data may include image data such as RGB image data, depth image data, and RGB-D (depth) image data.

The processor 180 may acquire the image data for the user through the camera 121 of the intelligent robot 100.

The processor 180 may receive the image data for the user, which is acquired by the camera (not illustrated) of the external device 300 through the communication unit 110.

For example, the AI robot 100 may directly acquire an image for a user through the camera 121 when the user is positioned in front thereof. When the user is not positioned in front of the AI robot 100, the AI robot 100 may receive image data for the user, which is collected by the camera (not illustrated) of the external devices 300.

That is, even if the AI robot 100 may not face the user or is far away from the user, the AI robot 100 may collect image data for the user through the external devices 300.

Alternatively, instead of receiving the image data for the user from the external devices 300, the AI robot 100 may receive the determined information on the user's action from the image data. In this case, an amount of data, which is received, may be significantly reduced when compared to the case that the image data is directly received.

The processor 180 may control the driving unit 160 to follow the user so as to acquire image data for the user when there is no operation being performed.

In this case, the processor 180 may recognize the user from the image data for the user acquired by the camera 121, and may control the driving unit 160 to follow the recognized user at a rear portion or a rear-side portion of the recognized user. Then, the processor 180 may follow the user and may obtain the image data for the user.

In addition, the processor 180 of the AI robot 100 determines the user's action using the image data (S803).

The processor 180 may generate the information on the user's action using the image data, and may determine the user's action based on the information on the user's action.

In this case, the image data may include all the image data acquired by the camera 121 of the AI robot 100 and the image data acquired from the camera (not illustrated) of the external devices 300.

The user's action may include an action of performing cleaning, lifting an object, or moving an object, and the action of performing cleaning includes sweeping, mopping, or vacuuming.

The processor 180 may recognize the user's actions from the image data using the motion recognition model.

The action recognition model may include an artificial neural network and may be a model that is learned by using a machine learning algorithm or a deep learning algorithm.

The action recognition model may include at least one of CNN (Convolutional Neural Network), RNN (Recurrent Neural Network), or LSTM (Long Short-Term Memory).

In this case, the action recognition module may be learned by a learning processor 130 of the AI robot 100 and stored in the memory 170 of the AI robot 100, or learned by a learning processor 240 of the AI server 200 and stored in the memory 170 of the AI robot 100 or the memory 230 of the AI server 200.

Although FIG. 8 illustrates that the processor 180 recognizes the user's action by directly using the action recognition module, the present invention is not limited thereto.

In other words, the processor 180 may transmit the image data to the AI server 200 through the communication unit 110 and may receive the user's action determined from the AI server 200.

Alternatively, the processor 180 may receive the determined user's action from the external device 300 through the communication unit 110. In this case, the external device 300 may determine the user's action directly based on the image data acquired for the user or through the AI server 200, and may transmit the determined the user's action to the AI robot 100.

In addition, the processor 180 determines whether cleaning corresponding to the user's action based on the user's action is necessary (S805).

The processor 180 may determine that the cleaning corresponding to the user's action is necessary, when the user cleans or moves an object, or when a contamination degree is increased due to the user's action.

When it is determined in step S805 that cleaning corresponding to the user's action is unnecessary, the processor 180 performs step S801 of acquiring image data for the user.

When it is necessary to perform the cleaning corresponding to the user's action as a result of the determination in step S805, the processor 180 determines a cleaning schedule in consideration of the user's action and an operation mode (S807).

The operation mode may be preset or may be set by the user's input.

The operation mode may include a first mode, a second mode, and the like.

The first mode may refer to a mode for performing the same cleaning action as the cleaning action of the user.

The second mode may refer to a mode for performing a cleaning operation of supplementing the user's action.

In this case, the second mode may refer to a mode for performing a cleaning operation different from the cleaning action of the user.

The detailed description of the cleaning schedule to assist the user's action will be made later with reference to FIGS. 10 to 11.

The processor 180 may output a notification of requesting the user to set the operation mode, through the display unit 151 or the sound output module 152, and may receive a setting value for the operation mode from the user through the microphone 122 or the user input unit 123.

In this case, even if there is absent a setting value for the operation mode, and when the operation mode is set, when it is determined that cleaning is necessary, the processor 180 may request the user to set the operation mode.

In this case, the processor 180 may determine an operation mode suitable for a user's action, and may provide a notification of recommending a suitable operation mode to the user.

For example, when the operation mode suitable for the user action is currently the second mode, the processor 180 may output a notification of recommending the second mode serving as the operation mode to a user through the display unit 151 or the sound output unit 152. Alternatively, when the first mode and the second mode are currently all appropriate to the current user's action, the processor 180 may output a notification of requesting the user to select the first mode or the second mode, through the display unit 151 or the sound output unit 12.

The processor 180 controls the cleaning unit and the driving unit based on the determined cleaning schedule (S809).

The cleaning schedule may include information on cleaning actions and a route for cleaning.

In this case, the processor 180 may control the driving unit 160 such that the AI robot 100 moves along the cleaning route.

In this case, the processor 180 may control the cleaning unit 190 such that the artificial intelligent robot 100 performs the cleaning action.

If the cleaning action included in the cleaning schedule is mopping, the processor 180 may control the mopping unit 192 to operate.

In this manner, the AI robot 100 may assist the user's action by cleaning according to the determined cleaning schedule.

Figure 9:
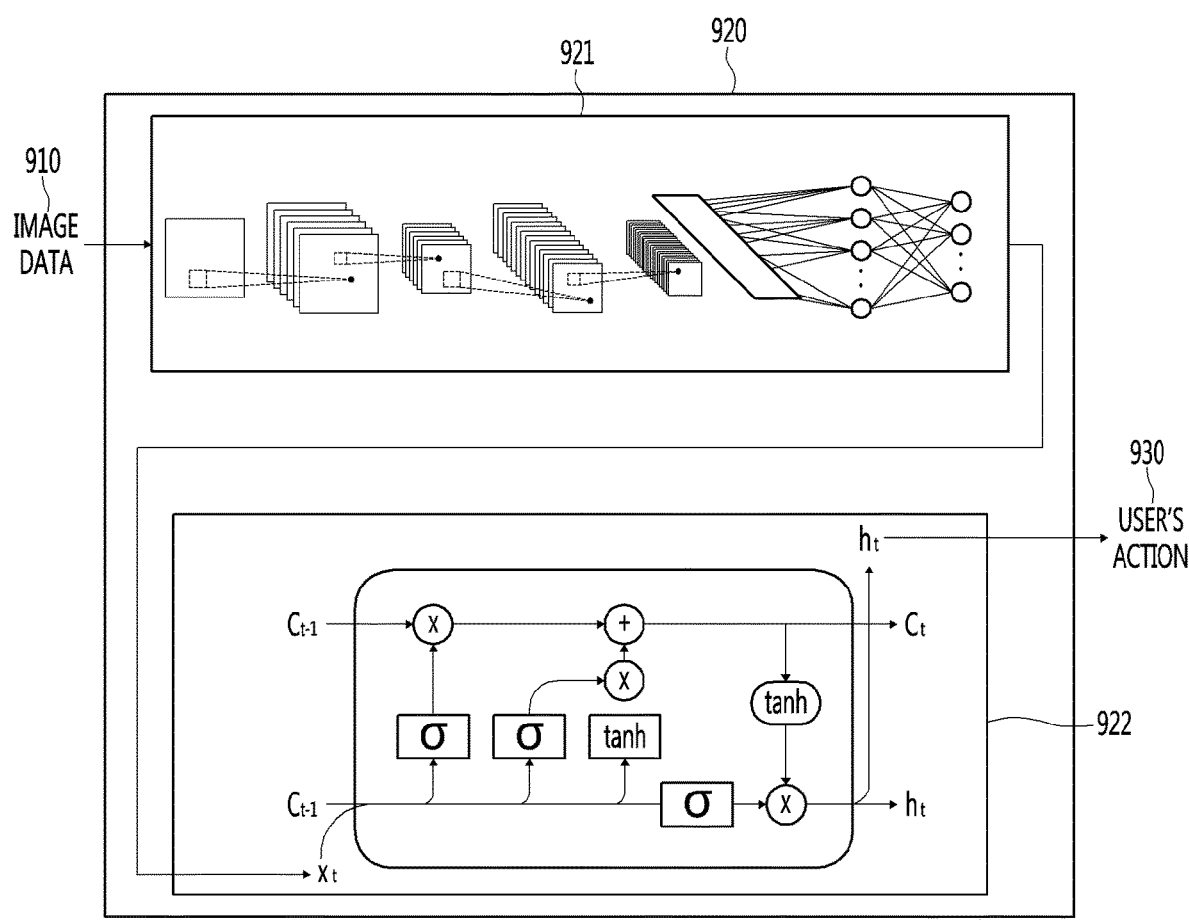
FIG. 9 is a diagram illustrating an action recognition model according to an embodiment of the present invention.

FIG. 9 is a diagram illustrating an action recognition model according to an embodiment of the present invention.

Referring to FIG. 9, when the processor 180 of the AI robot 100 receives image data 910, the processor 180 may determine a user's action 930 by using the action recognition model 920.

In this case, the action recognition module 920 may determine a user's action 930 by recognizing a user and an object in an image through a CNN 921, and analyzing time-series movements of the user and the object through the RNN or the LSTM 922.

The recognized objects may include an object such as a cleaning tool, furniture, or an appliance.

Figure 10:
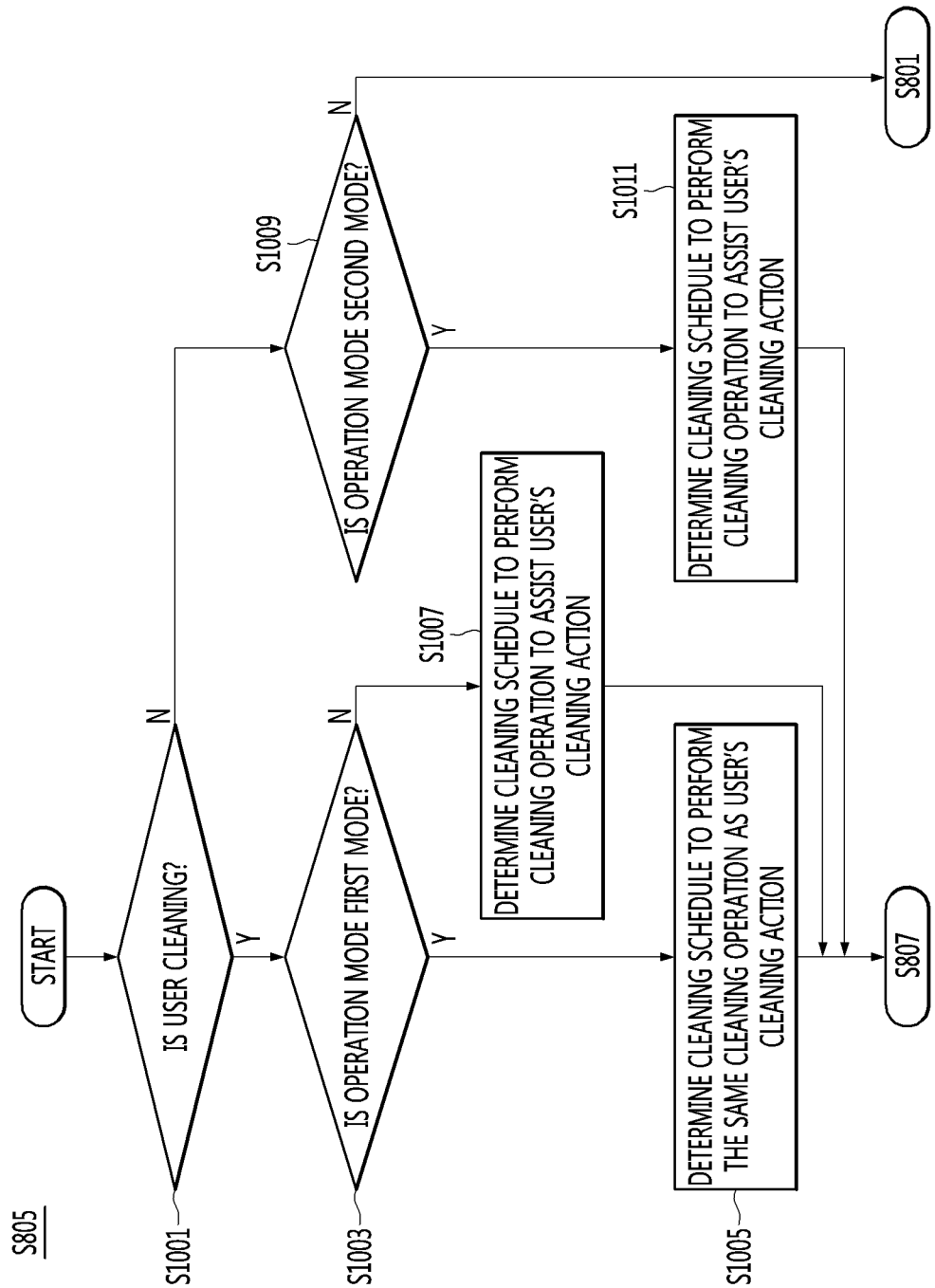
FIG. 10 is a flowchart illustrating an example of the step S805 of determining whether cleaning is necessary as in FIG. 8.

FIG. 10 is a flowchart illustrating an example of the step S805 of determining whether cleaning is necessary as in FIG. 8.

Referring to FIG. 10, the processor 180 may determine whether a user is cleaning, based on the user's action which is determined (S1001).

The processor 180 may determine whether the user is cleaning, based on whether the user is holding the cleaning tool or using the cleaning tool.

For example, the processor 180 may determine that the user is cleaning when the user is sweeping, mopping, or vacuuming using a vacuum cleaner.

When it is determined in step S1001 that the user is cleaning, the processor 180 determines whether the operation mode is the first mode (S1003).

In this case, although the processor 180 may simply identify a setting value of an operation mode, the processor 180 may ask the user how to set the operation mode and acquire the response to the asking.

For example, even if a present operation mode is the first mode, the processor 180 may notify the user of that the present operation mode is the first mode while outputting a notification of asking the user whether to change the operation mode, through the speaker 152. In addition, the processor 180 may receive the response of the user through the microphone 122 to determine whether to change the operation mode.

When the operation mode is the first mode as the determination result of step S1003, the processor 180 determine the cleaning schedule to perform the same cleaning action as the cleaning action of the user (S1005).

For example, when the user performs sweeping or vacuuming, the processor 180 may determine the cleaning schedule to perform vacuuming.

Similarly, when the user performs mopping, the processor 180 may determine the cleaning schedule to perform the mopping.

In this case, the processor 180 may detect the cleaning direction or the moving direction of the user and may determine the cleaning route based on the cleaning schedule to move in a direction opposite to the moving direction of the user.

In other words, the AI robot 100 may perform the same cleaning action as the cleaning action of the user, while performing the cleaning in the opposite direction the cleaning direction of the user, thereby completing the cleaning more rapidly.

When it is determined in step S1003 that the operation mode is not the first mode, the processor 180 determines a cleaning schedule to perform a cleaning operation to assist the cleaning action of the user (S1007).

For example, when the user is sweeping, the processor 180 may determine that the cleaning schedule to perform suction foreign matters, such as dust or garbage, collected through the seeping of the user.

Similarly, when the user is mopping, the processor 180 may determine the cleaning schedule to suction foreign matters, such as dust or garbage in front of the user.

Similarly, when the user is vacuuming using a vacuum cleaner, the processor 180 may determine the cleaning schedule to perform mopping with respect to an area that the user has already cleaned.

If it is determined in step S1001 that the user is not cleaning, the processor 180 determines whether the operation mode is the second mode (S1009).

In this case, similarly to step S1003, although the processor 180 may simply identify a setting value of an operation mode, the processor 180 may ask the user how to set the operation mode, and acquire the response to the asking.

In this case, the processor 180 may ask the user whether the operation mode is set to the second mode to perform cleaning to assist the user's action, through the sound output unit 152, and may set the operation mode by obtaining the response to the ask from the user.

In this case, the processor 180 may ask the user whether to perform an action based on the second mode, through the sound output unit 152, and may set the operation mode by obtaining the response of the user. In other words, the AI robot 100 asks the user whether to perform the action when the operation mode is set to the second mode, instead of asking the user whether to set the operation mode to the second mode.

For example, when the user moves an object, the processor 180 asks the user "May I set the operation mode to the second mode?" through the sound output unit 152. Alternatively, the processor 180 may ask the user "May I clean the position at which the object has been occupied?", and may set the operation mode based on the response from the user.

When it is determined in step S1009 that the operation mode is the second mode, the processor 180 determines the cleaning schedule to perform a cleaning action to assist the user's action (S1011).

For example, when the user performs an action of lifting an object, the processor 180 may determine to perform at least one of vacuuming or mopping the area in which the lifted object has been located, according to the cleaning schedule.

Similarly, when the user performs an action of moving an object, the processor 180 may determine that at least one of vacuuming or mopping the area in which the object moved according to the cleaning schedule has been located.

Similarly, when the user performs an action to generate foreign matters such as dust or trash, the processor 180 may determine to perform at least one of vacuuming or mopping to remove foreign matters generated resulting from the cleaning schedule.

When it is determined in step S1009 that the operation mode is not the second mode, the processor 180 returns to step S801 to acquire image data for the user instead of determining a separate cleaning schedule.

FIG. 11 is a diagram illustrating an example of a cleaning schedule based on an operation mode and the user's action according to an embodiment of the present invention.

Referring to FIG. 11, when the operation mode is the first mode, the processor 180 may determine the cleaning schedule to perform a cleaning action identical to or similar to the cleaning action of the user.

When the operation mode is the first mode and when the user performs the sweeping, the processor 180 may determine the cleaning schedule to perform vacuuming in the opposite direction to the cleaning direction of the user.

When the operation mode is the first mode and the user is mopping, the processor 180 may determine the cleaning schedule to perform mopping in the opposite direction of the cleaning direction of the user.

When the operation mode is the first mode and the user is vacuuming, the processor 180 may determine the cleaning schedule to perform vacuuming in the opposite direction to the cleaning direction of the user.

In this case, the cleaning in the opposite direction to the cleaning direction of the user may refer to perform cleaning an area in which the user does not clean by determining the area. In addition, in spite of the opposite direction, if the area is determined as being cleaned by the user, the cleaning action may be not performed.

Alternatively, the processor 180 may determine the cleaning route such that the cleaning is performed from an area far away from the user instead of the opposite direction to the cleaning direction of the user.

When the operation mode is the second mode, the processor 180 may determine the cleaning schedule to perform a cleaning action to assist the user's action.

When the operation mode is the second mode and when the user performs the sweeping, the processor 180 may determine the cleaning schedule to perform vacuuming to suction foreign matters resulting the sweeping by the user, or to perform mopping while following the user.

In this case, the processor 180 may determine the cleaning schedule to suction the foreign matters when the user stops the sweeping.

When the operation mode is the second mode and the user is mopping, the processor 180 may determine the cleaning schedule to perform vacuuming in front of the user.

When the operation mode is the second mode and the user is vacuuming, the processor 180 may determine the cleaning schedule to perform mopping while following the user.

When the operation mode is the second mode and the user is lifting an object or moving the object, the processor 180 may determine the cleaning schedule to perform at least one of vacuuming or mopping with respect to an area in which the object has been positioned.

In this case, whether to perform only vacuuming, only mopping, or both the vacuuming and the mopping with respect to the area in which the object has been positioned may be determined by the user's input.

For example, when the processor 180 recognizes that the user moves the object, the processor 180 may ask the user "May I perform mopping with respect to the space in which the object has been positioned?". If the user makes a response of "Suction dust", the processor 180 may determine the cleaning schedule to perform the vacuuming.

FIG. 12 is a diagram illustrating an example of the cleaning schedule according to an embodiment of the present invention.

FIG. 12 illustrates a situation that a user 1201 moves an object 1202.

Referring to FIG. 12, before the user 1201 moves the object 1202, the artificial intelligent robot 100 may determine only the cleaning schedule having the cleaning route 1211 for cleaning except for the area in which the object 1202 is located.

However, when the user 1201 moves the object 1202 in the situation that the operation mode is the second mode, the processor 180 may determine the cleaning schedule having a cleaning route 1221 for cleaning an area including the area in which the object 1202 has been positioned.

In this case, when the operation mode is not set to the second mode, the processor 180 may ask the user whether to set the operation mode to the second mode or whether to perform the cleaning according to the second mode.

Figure 13:
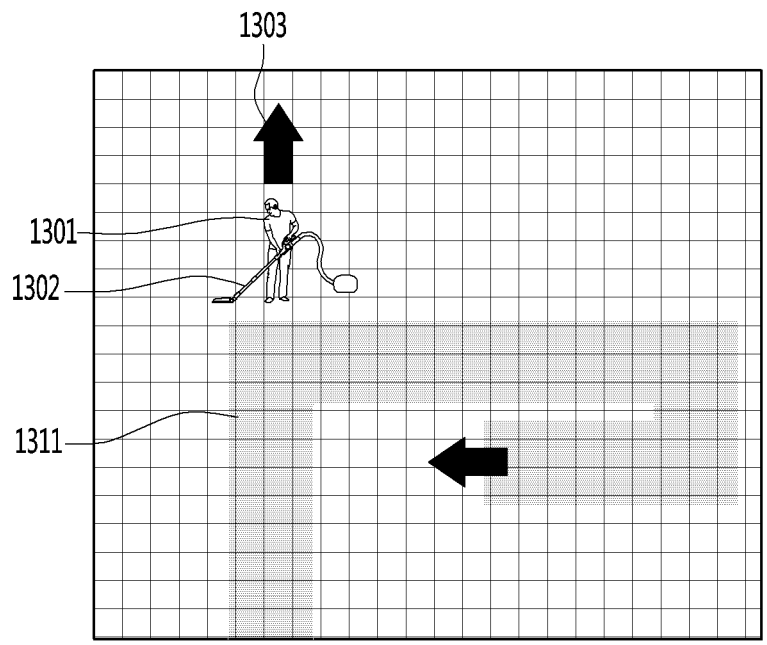
FIG. 13 is a diagram illustrating an example of a cleaning schedule according to an embodiment of the present invention.

FIG. 13 is a diagram illustrating an example of the cleaning schedule according to an embodiment of the present invention.

FIG. 13 illustrates the situation that a user 1301 performs vacuuming in a specific direction 1303 using a cleaning machine 1302.

Referring to FIG. 13, when the user 1301 performs the vacuuming using the cleaning machine 1302 in the situation that the operation mode is the first mode, the processor 180 may determine a cleaning schedule to perform vacuuming along a route 1311 in a direction opposite to a forward direction 1303 of the user.

In this case, if the operation mode is not set to the first mode, the processor 180 may ask the user whether to set the operation mode to the first mode or whether to perform the cleaning according to the first mode.

Figure 14:
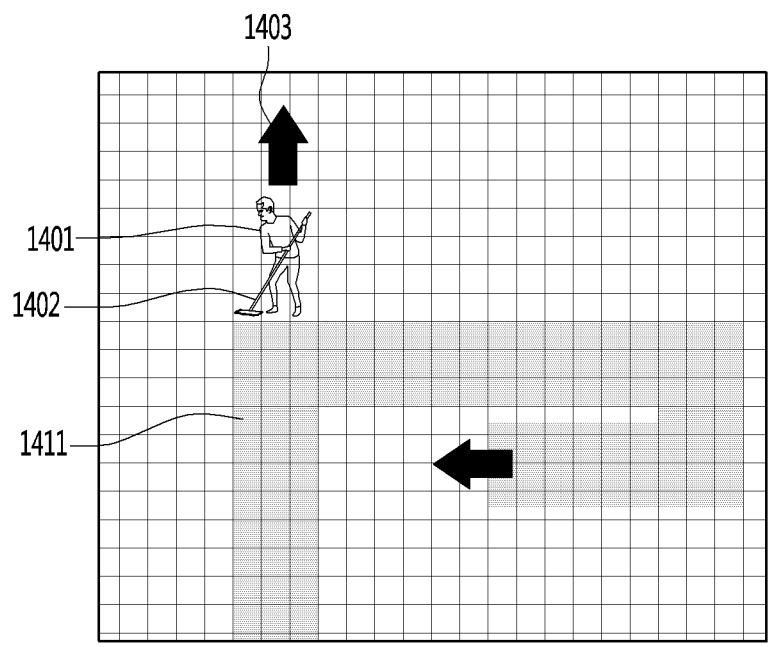
FIG. 14 is a diagram illustrating an example of a cleaning schedule according to an embodiment of the present invention.

FIG. 14 is a diagram illustrating an example of the cleaning schedule according to an embodiment of the present invention.

FIG. 14 illustrates that a user 1401 performs mopping in a specific direction 1403 using a mop 1402.

Referring to FIG. 14, when the user 1401 performs the mopping using the mop 1402 in the situation that the operation mode is the first mode, the processor 180 may determine a cleaning schedule to perform mopping along a route 1411 in a direction opposite to a forward direction 1403 of the user.

In this case, when the operation mode is not set to the first mode, the processor 180 may ask the user whether to set the operation mode to the first mode or whether to perform the cleaning according to the first mode.

FIG. 15 is a diagram illustrating an example of the cleaning schedule according to an embodiment of the present invention.

FIG. 15 illustrates the situation that a user 1501 performs sweeping using a broom 1502.

Referring to FIG. 15, while the user 1501 performs the sweeping in the situation that the operation mode is the second mode, the processor 180 may determine a cleaning schedule having a cleaning route 1511 for cleaning in back of the user 1501 such that the sweeping of the user 1501 is not interrupted.

In addition, the processor 180 may determine an area 1504 or a position in which foreign matters are aggregated, based on a track 1503 of the sweeping by the user 1501, and may determine a cleaning schedule having a cleaning route 1521 for cleaning the area 1504 in which the foreign matters are aggregated, when the user 1501 finishes the sweeping or moves to another area.

In this case, when the operation mode is not set to the second mode, the processor 180 may ask the user whether to set the operation mode to the second mode or to perform the cleaning according to the second mode.

In an embodiment, the processor 180 may determine the cleaning schedule to clean an area in which foreign matters are increased by using sensor data, instead of inferring the area in which the foreign matters are aggregated along the cleaning track.

In this case, the processor 180 may determine a cleaning schedule to clean an area in which the user has performed sweeping, after the user 1501 stops the sweeping or moves to another area or to more than a specific distance, so as to prevent the sweeping of the user 1501 from being interrupted.

According to an embodiment of the present invention, the above-described method may be implemented as a processor-readable code in a medium where a program is recorded. Examples of a processor-readable medium may include read-only memory (ROM), random access memory (RAM), CD-ROM, a magnetic tape, a floppy disk, and an optical data storage device.

What is claimed is:

1. An artificial intelligence (AI) robot for cleaning in consideration of a user's action, comprising:
    a camera configured to acquire a first image data for the user and an object;
    a cleaner body including at least one of a suction portion or a mopping portion;
    a motor configured to drive the artificial intelligence (AI) robot; and
    a processor configured to:
        determine the user's action including at least one of cleaning, lifting the object, or moving the object based on the first image data using an action recognition model;
        determine an operation mode between a first mode for performing cleaning of an area where the user is not located, or a second mode for performing cleaning of an area where the user is located, based on the user's action as determined using the action recognition model;
        determine a cleaning schedule including a cleaning action and a cleaning route based on the operation mode; and
        control the cleaner body based on the cleaning action and the motor based on the cleaning route.

2. The AI robot of claim 1, wherein the processor is configured to:
    determine the cleaning schedule in consideration of the operation mode which is preset or set by an input of the user.

3. The AI robot of claim 2, wherein the processor is further configured to:
    identify a present operation mode,
    notify the user of the present operation mode,
    output a notification asking whether to change the present operation mode,
    acquire a response from the user,
    determine the operation mode corresponding to the response, and
    based on the operation mode being the first mode, determine the cleaning schedule as a schedule for cleaning an area where the user has not cleaned using the same cleaning action as the user's action, wherein the user's cleaning action includes vacuuming or mopping.

4. The AI robot of claim 3, wherein the processor is configured to:
    based on the operation mode being the first mode, determine the cleaning route of the cleaning schedule to be opposite to a forward direction of the user using the first image data.

5. The AI robot of claim 1, wherein the processor is further configured to:
    identify a present operation mode,
    notify the user of the present operation mode,
    output a notification of asking whether to change the present operation mode,
    acquire a response from the user,
    determine the operation mode corresponding to the response, and
    based on the operation mode being the second mode, determine the cleaning schedule as a schedule for assisting the user's action based on the response in the area where the user is.

6. The AI robot of claim 5, wherein the processor is configured to:
    based on the operation mode being the second mode and the user's action is cleaning which includes sweeping as determined using the action recognition model, infer an area or a position in which garbage is to be aggregated based on a track of the sweeping by the user, determine the cleaning schedule as a schedule for vacuuming the garbage resulting from the sweeping.

7. The AI robot of claim 5, wherein the processor is configured to:
    based on the operation mode being the second mode, and the user's action is cleaning which includes vacuuming as determined using the action recognition model, determine the cleaning schedule as a schedule for mopping an area cleaned by the user based on the operation mode which is preset or set by an input of the user when the cleaner body includes the mopping portion.

8. The AI robot of claim 5, wherein the processor is configured to:
    based on the operation mode being the second mode and the user's action is cleaning which includes mopping as determined using the action recognition model, determine the cleaning schedule as a schedule for vacuuming garbage on the floor in front of a forward path of the user based on the operation mode which is preset or set by an input of the user when the cleaner body includes the suction portion.

9. The AI robot of claim 5, wherein the processor is configured to:
based on the operation mode being the second mode and the user's action is lifting the object as determined using the action recognition model, ask the user the cleaning schedule for the AI robot to perform,
determine the cleaning schedule as a schedule for cleaning an area where the object was placed based on a response of the user, and
perform the cleaning schedule based on the determined cleaning schedule.

10. The AI robot of claim 1, further comprising:
a communication interface configured to receive a second image data for the user from at least one or more external devices including a camera, or to receive the user's action determined by the external device based on the second image data for the user,
wherein the processor is configured to:
determine the user's action based on the first image data and the second image data using the action recognition model.

11. The AI robot of claim 10, wherein the communication interface is configured to:
communicate with the at least one or more external devices directly or through a router or a base station, by using a fifth generation (5G) communication technology.

12. The AI robot of claim 1, wherein
the action recognition model is learned by using a machine learning algorithm or a deep learning algorithm.

13. The AI robot of claim 12, wherein the action recognition module is configured with at least one or more of a Convolutional Neural Network (CNN), a Recurrent Neural Network (RNN), or a Long Short-Term Memory (LSTM).

14. A cleaning method in consideration of a user's action, the cleaning method comprises:
acquiring a first image data for the user and an object using a camera;
determining the user's action including at least one of cleaning, lifting the object, or moving the object based on the first image data using an action recognition model which is learned by using a machine learning algorithm or a deep learning algorithm;
determining an operation mode between a first mode for performing cleaning of an area where the user is not located, or a second mode for performing cleaning of an area where the user is located, based on the user's action as determined using the action recognition model;
determining a cleaning schedule including a cleaning action and a cleaning route based on the operation mode; and
controlling a cleaner body based on the cleaning action and a motor based on the cleaning route.

15. A non-transitory recording medium having a program to execute a cleaning method in consideration of a user's action,
wherein the cleaning method in consideration of the user's action includes:
acquiring a first image data for the user and an object using a camera;
determining the user's action including at least one of cleaning, lifting the object, or moving the object based on the first image data using an action recognition model which is learned by using a machine learning algorithm or a deep learning algorithm;
determining an operation mode between a first mode for performing cleaning of an area where the user is not located, or a second mode for performing cleaning of an area where the user is located, based on the user's action as determined using the action recognition model;
determining a cleaning schedule including a cleaning action and a cleaning route based on the operation mode; and
controlling a cleaner body based on the cleaning action and a motor based on the cleaning route.

16. The AI robot of claim 1, wherein the user's action of performing cleaning includes sweeping, mopping, or vacuuming.

17. The AI robot of claim 1, wherein the object includes at least one of a cleaning tool, furniture, or an appliance.

18. The AI robot of claim 17, wherein the processor is configured to determine whether the user is cleaning based on the user holding the cleaning tool or using the cleaning tool.

19. The AI robot of claim 6, wherein the processor is configured to determine the cleaning schedule to clean an area in which garbage is increased by using sensor data.

20. The AI robot of claim 1, wherein the second mode is a mode for performing the cleaning action which is different from the user's action in the area where the user is located.

* * * * *